March 10, 1959     H. L. HARTMAN     2,876,648
VARIABLE SPEED PHONOGRAPH DRIVE MECHANISMS
Filed Aug. 8, 1955     3 Sheets-Sheet 1

INVENTOR
Herbert L. Hartman
BY
ATTORNEYS

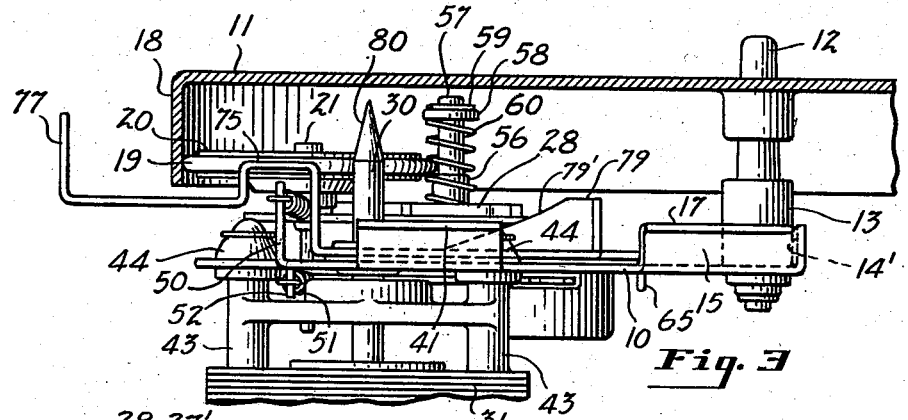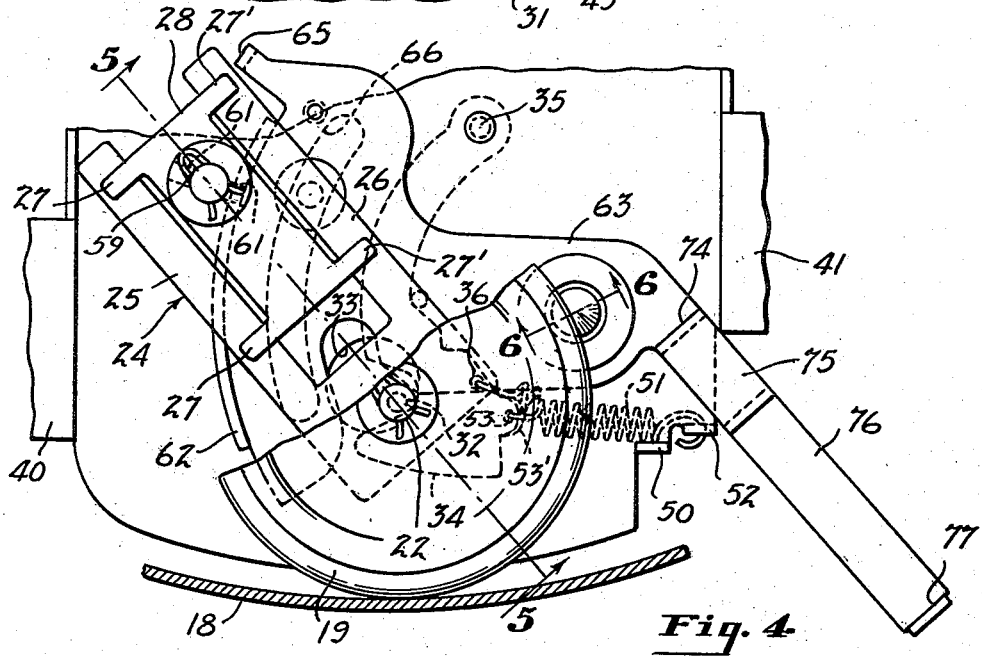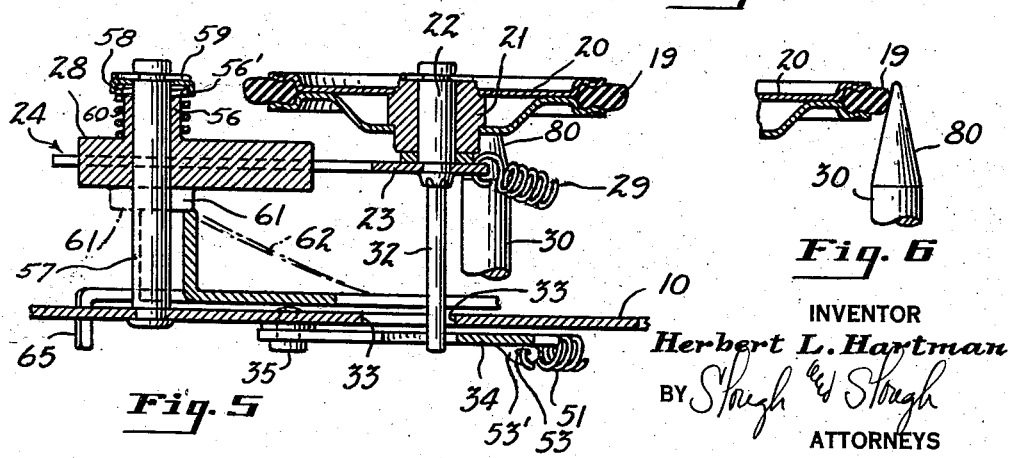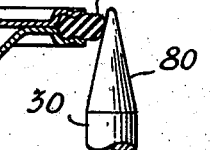

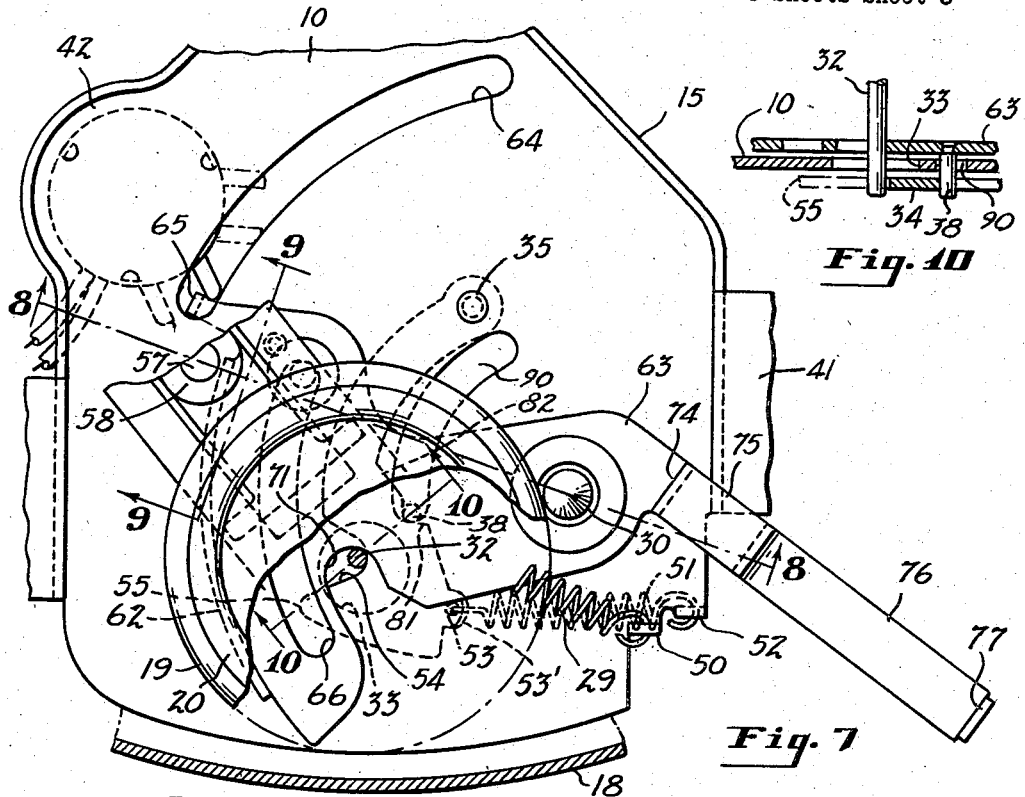
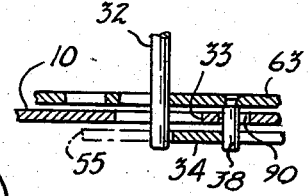
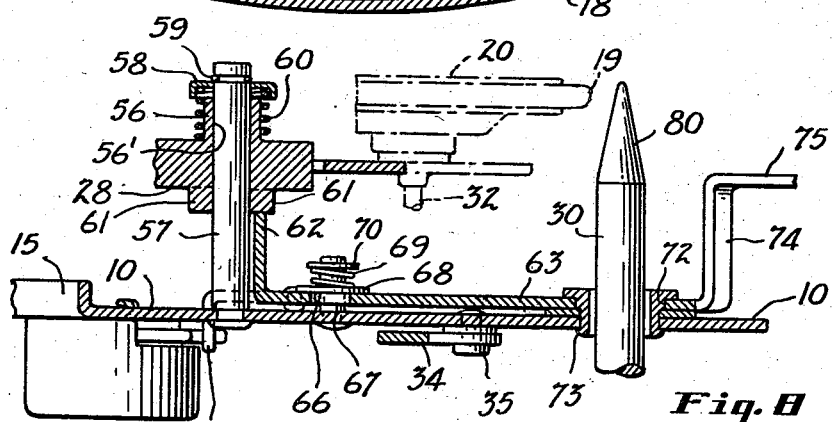
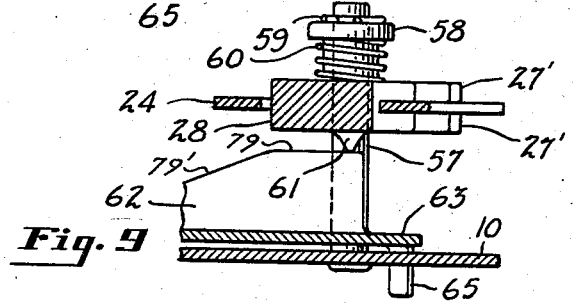
March 10, 1959 H. L. HARTMAN 2,876,648
VARIABLE SPEED PHONOGRAPH DRIVE MECHANISMS
Filed Aug. 8, 1955 3 Sheets-Sheet 3
Fig. 10
Fig. 7
Fig. 8
Fig. 9
INVENTOR
Herbert L. Hartman
BY
ATTORNEYS

United States Patent Office

2,876,648
Patented Mar. 10, 1959

2,876,648

VARIABLE SPEED PHONOGRAPH DRIVE MECHANISMS

Herbert L. Hartman, Elyria, Ohio, assignor to The General Industries Company, Elyria, Ohio, a corporation of Ohio Application August 8, 1955, Serial No. 526,949

15 Claims. (Cl. 74—191)

My invention relates to variable speed phonograph turntable drives and relates more particularly to an improved driving mechanism adapted to drive said turntable at any desired speeds.

It is an object of my invention to provide an improved turntable driving mechanism of the type referred to known as the "conical drive" in which the speed can be varied at will.

Another object of my invention is to provide improved mechanism for selecting and maintaining the speeds at which the turntable is to be rotated.

A still further object of my invention is to provide improved mechanism for moving the idler wheel into an out of contact with the turntable and with the driving shaft for driving or disengaging the same.

Another object of my invention is to provide a mechanism of the type referred to which will be simple and inexpensive to manufacture, being composed of but few parts, and highly efficient in use.

Other objects of my invention and the invention itself will become more readily apparent from a purview of the description which follows, in which description reference is had to the accompanying drawings, in which drawings:

Fig. 1 is a top plan view of an embodiment of my invention secured to a mounting plate exposed to view by cutting away portions of a superposed turntable from a remaining mere fragment of a record player portion, the latter being shown as engaged by the idler wheel of the said embodiment, the shift lever being shown in solid lines in high speed position and dotted lines indicating the "low" speed and "off" position of the manually operated portions of the lever;

Fig. 3 is a section taken on the line 3—3 of Fig. 1;

Fig. 4 is an enlarged top plan view showing the lever and its associated parts in an intermediate or "low" speed position;

Fig. 5 is a sectional view taken on the line 5—5 of Fig. 4;

Fig. 6 is a view taken on the line 6—6 of Fig. 4;

Fig. 7 is an enlarged top plan view similar to the view of Fig. 4 showing the lever and its switch means in its "off" position;

Fig. 8 is a sectional view taken on the line 8—8 of Fig. 7 and showing in dotted lines a portion of the idler wheel, the idler wheel being out of engagement with the motor shaft.

Fig. 9 is a view taken on the line 9—9 of Fig. 7;

Fig. 10 is a view taken on the line 10—10 of Fig. 7.

Figure 1:
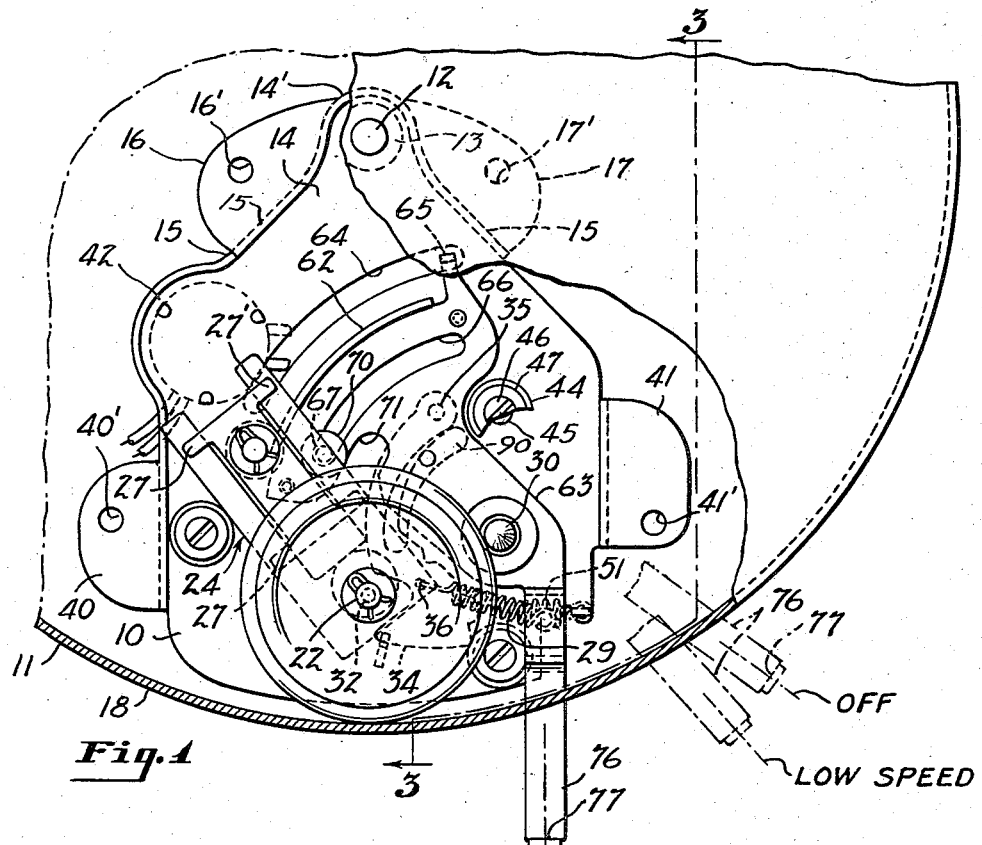
Figure 2:
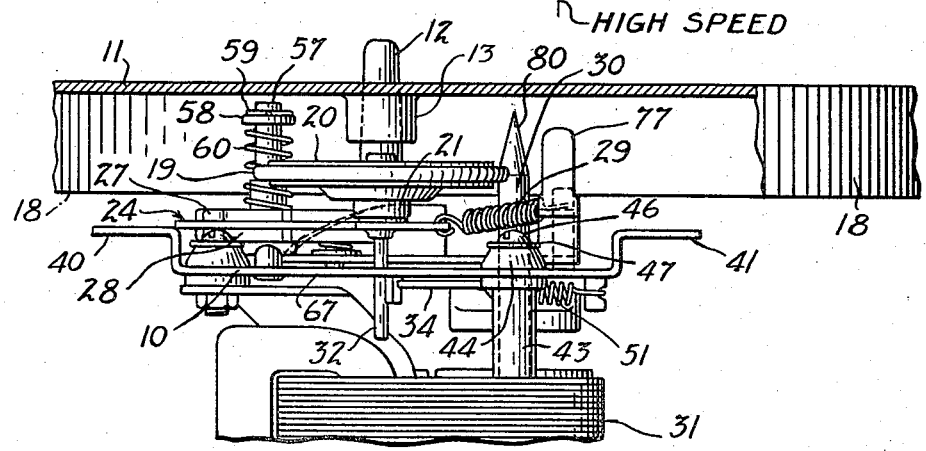
Fig. 2 is a front elevational view of the mechanism of Fig. 1, a certain portion of the turntable being broken away to more clearly show the underlying mechanism.

Referring now to the drawings and referring more particularly to Figs. 1 and 2, the main supporting plate 10 is of sheet metal and the turntable 11 may be carried on a turntable post 12 journalled in a bearing tube 13 for rotation and mounted as shown in Figs. 1 and 2 in the apex 14' of a generally triangular formed portion 14 of the mounting plate 10. The peripheral plate edges surrounding the apex or turntable post mounting are provided with an upwardly extending peripheral flange 15 and a pair of generally flat outwardly extending ears 16 and 17, said ears each being provided with a circular opening 16' and 17' respectively, whereby the motor plate 10 may be secured to a motor board (not shown) when the same is assembled in a record player mechanism.

Another pair of flat ear attachment portions 40 and 41 having apertures 40' and 41' therein are integrally formed on opposite sides of the mounting plate 10 and the motor board described and extend in the plane of the first set of ears 16 and 17 and are spaced above but parallel to the remainder of the mounting plate. Intermediate the ears 16 and 40 a switch mounting is provided in an arcuate corner 42 of the plate 10.

The motor 31 is suspended by means of a plurality of posts 43 of a bearing frame supporting the motor field and armature. Nuts 46 are screw threaded into the posts 43 through washers 47 and bushings 44 disposed above the mounting plate 10.

The turntable 11 as shown is preferably provided with a pendant flange 18 having a cylindrical inner surface with which the rubber peripheral tread 19 of an idler wheel 20 mounted, as hereinafter described, is engaged whereby rotation of the idler wheel may drive the turntable at a speed determined by the rate of rotation of the idler wheel.

The idler wheel 20 is provided with a hub 21, which hub is journalled upon an upright post 22 rigidly secured, as best illustrated in Fig. 5, at its lower end to the yoke portion 23 of a U-shaped slide element, generally indicated at 24 in Fig. 1. The said slide element 24 preferably is provided with parallel arms 25 and 26 which make bearing fitting engagement within slideways afforded by notches laterally directed inwardly of the arms 27 and 27' of a mount element 28, in the manner discussed in Letters Patent No. 2,421,910 issued to Herbert L. Hartman. The slide element 24 may be moved longitudinally of the arms subject to restrictions imposed on such movement by the tension spring 29 and any engagement had by the idler wheel with the turntable flange 18 and also by the engagement with said idler wheel with the shaft 30 of the drive motor 31. The slide 24 is also provided at its yoke end with a projecting pin or a relatively narrow, elongated post extension means 32 adapted to project through a circular opening 33 disposed immediately below the said yoke of the slide element in the said mounting plate 10, whereby said means 32 are adapted to engage shift release means 34 disposed beneath said mounting plate, said shift release means being generally of J-shaped form, and rotatably secured to said mounting plate 10 by stud means 35. The spring 29 is anchored to the yoke 23 of the idler wheel carrying slide element 24 by means of an opening 36 therein and at its opposite end is anchored to an upstanding lug 50 carried by the main supporting plate 10 adjacent the lateral edge thereof carrying the ear 41.

The shift release means 34 referred to herein also operates under spring tension exerted by spring means 51 secured to a downstruck lug 52 disposed adjacent the upstanding lug 50 of the main supporting plate 10, the said spring 51 being anchored through an opening 53 in a downturned tab 53' forming the heel of said J-shaped shift release lever 34.

It will be noted that the pin means 32 is adapted, in various operative positions, as hereinafter described, to be locked in an arcuate notch 54 disposed in the lever 34 adjacent the toe 55 thereof. This is illustrated most clearly in Fig. 7 of the drawings.

The J-shaped release lever 34 is further provided with a generally V-shaped notch 81 disposed adjacent its heel portion at a point generally opposite the arcuate notch 54 in the toe portion of the shift release means 34. The notch 81 is adapted to lockingly receive a detent 38 which is integrally mounted upon the shift lever 63 in a portion generally adjacent the notch 71 of the shift lever and said detent, and as best shown in Fig. 10, projects vertically downwardly from the under-surface of said shift lever through the arcuate slot 90 in the mounting plate 10 to contact the shift release lever 34. The slot 90 corresponds in curvature but is of less extent than the arcuate slot 64.

In operation when the mechanism is in its non-operating switch-off position, the detent 38 is locked within the V-shaped notch 81 referred to against the action of the spring 51 and the idler wheel is thus held out of contact with the conical driving surfaces of the motor shaft 30 and out of contact with the turntable flange 18, as shown in Figs. 7 and 8.

Upon movement of the shift lever 63 to motor-on position, the detent 38 secured thereto is moved out of its locked engagement with the said notch 81, and contacts the tapered surface 82 of the release lever and then rides freely against the back of the release lever, as shown in Fig. 1 and Fig. 4, wherefore the spring tension exerted by the springs 51 and 29 is released and the slide element 24 carrying the idler wheel 20 is moved longitudinally toward the turntable flange and toward the motor shaft thus bringing the idler wheel 20 into contact with the turntable flange 18 and the conical driving surface 80 of the motor shaft 30.

When the mechanism is reversed and moved from its operating to its non-operating position, the detent 38 first contacts the curved surfaces of the shift release lever with which it is in contact until it is brought into contact with the tapered surface at which point it traverses the taper and the slide element 24 is moved rearwardly, thus drawing the idler wheel away from its contact with the driving shaft and out of engagement with the flange 18 and further movement into the V-shaped notch 81 locks the idler wheel 20 in such adjusted position.

The mount element 28 is provided with a hub 56 having a cylindrical bore 56' therein, said hub being integrally formed with said mount element and projecting upwardly therefrom and being journalled upon a relatively longer upstanding post 57, which is rigidly secured to the mounting plate 10, as shown in Fig. 5. At its upper end said post is provided with a metallic disc 58 telescopably secured upon the post by hairpin means 59 and seated upon coil spring means 60 telescoped over said hub and post, said spring seating upon the mount 28 at its lower end. The hub 56 of the mount 28 is further provided on its under surface adjacent the cylindrical bore above referred to with a pair of downwardly extending tapered teeth 61, one of said teeth being adapted to cammingly engage an arcuately formed upstanding cam surface 62 of a shift lever assembly later more fully described herein.

The main supporting plate 10 is provided with a relatively elongated arcuately formed opening 64 extending from a portion of said plate adjacent the "on" and "off" switch means to a position adjacent the outwardly extending ear 17 and an outwardly projecting downwardly extending narrow finger 65 of a shift lever 63 is adapted to project beyond the camming surface 62 of the said shift lever to ride within the opening 64 to limit reciprocable movement of said lever thereby. The lever 63 is further provided at its relative wide camming end portion with a slot 66 of substantially the same curvature as that of the slot 64 spaced therefrom but said slot is of lesser extent.

A relatively short post 67 securely fastened to the main plate 10 is provided with a disc 70 on its upper portion, said disc being adapted to over-ride said slot 66, said post being provided with a tension spring 69 telescoped thereon and bearing against said disc. The shift lever 63 is further provided with a generally U-shaped notch 71 adjacent one side of the slotted relatively wide portion of the said shift lever, the pin 32 being seated within said notch when the shift lever is in its "off" position shown in Fig. 7.

The shift lever 63 is, as shown in Fig. 8, provided at an intermediate portion thereof with a circular opening 72 through which the rotor shaft 30, later more fully described herein, is loosely projected. The shift lever 63 is secured to the main plate 10 by means of bearing means 73, as best shown in said figure, and said shift lever is provided adjacent said rotor shaft opening 72 with an upstanding arm 74 disposed at generally right angles to the remainder of said shift lever, said arm being of such heighth as to dispose an elevated arm portion 75 of said lever above the upstanding lug 50. Said lever is additionally provided with a handle portion 76 adapted to project outwardly of the turntable and adapted to be optionally provided with a finger engaging upstanding portion 77.

If desired, the camming surface 62 mentioned herein above may be generally arcuate in form as shown and provided with a pair of generally flat mounts 78 and 79 at either end of a generally tapered camming portion 79'.

As indicated hereinabove a tooth 61 carried by the slide mount 28 engages the upper surface of said camming flange 79', as best shown in Fig. 7. When the lever 63 is in its "off" position and upon movement of the handle portion 76 of the lever in clockwise direction from "off" to "low" speed, the finger 65 switches the "on" and "off" switch projecting into the opening 64, as shown in Fig. 7, to its "on" position, as best shown in Fig. 7, and the tread portion of the idler wheel, which will be more fully described later herein, is brought into engagement with the upper surface of the tapered conical end 80 of the rotor shaft 30, as shown in Figs. 1 and 3, said wheel having been in spaced relation to said shaft when said mechanism is in the "off" position, as best shown in Figs. 7 and 8.

The tooth 61 carried by the mount 28 when in the operative position of "low" speed engages the tapered surface 79' of the camming edge of the lever and the spring 60 opens to the position best illustrated in Figs. 4 and 5. Movement of the handle in a further clockwise position moves the finger 65 to the end of the slot 64, the mount and idler carried by the idler wheel mount taking the position best shown in solid lines in Figs. 1 and 2, wherefore the spring 60 will assume its extended position, the tooth 61 resting upon the flat tapered surface 79 and the tread of the idler wheel engaging the relatively wide base of the cone of the driving shaft, wherefore the turntable will be driven at a relatively higher speed than when portions of relatively less diameter of said cone are engaged by the idler wheel.

As will be apparent, the improved driving mechanism of my invention can, by bringing the tread portion of the idler wheel into association with the various portions of the tapered conical surface 80 of the driving shaft 30, drive the turntable at various speeds.

It will be further evidenced that in the improved mechanism of my invention the idler wheel, when the motor is turned off, is withdrawn from its driving engagement with both the turntable flange and the driving shaft. The same is efficiently and expeditiously accomplished by a single shift lever, which carries means adapted to turn the motor switch "off" and "on" to bring the idler wheel into and out of its operating position and to drive the mechanism at various speeds.

While I have described my invention in connection with an improved embodiment thereof, I am aware that numerous and extensive departures may be made therefrom without however departing from the spirit of my invention and the scope of the appended claims.

I claim:

1. In a drive mechanism for a phonograph, a phonograph motor, a support for said motor, said support having a turntable post associated therewith adapted to carry a turntable, a motor shaft having a conical upper surface, the turntable having a pendant flange, an idler wheel adapted to be interposed between said shaft and said turntable flange, a mount for said idler wheel secured to said support, said idler wheel adapted to be reciprocally and longitudinally moved with respect to said mount, said support having a pair of arcuate slots therein, a shift lever telescoped over said shaft and having a manually operated handle portion, a relatively wide shift portion having an arcuate slot therein, means secured to said support projecting through said arcuate slot in the shift lever adapted to limit the range of movement of said shift lever, shift release means hingedly secured to said support on the undersurface thereof, said idler wheel having means associated therewith adapted to be moved upon movement of said shift lever into engagement with said shift release lever to optionally move said idler wheel into engagement and out of engagement with respect to said shaft and turntable flange.

2. A drive mechanism for phonographs as set forth in claim 1, characterized by the said shift lever having locking means and said shift release means having interlocking means adapted to be associated with said locking means whereby the said idler wheel may be locked out of contact with said driving and driven members.

3. A drive mechanism for phonographs comprising a motor shaft, said shaft being provided with upper conical driving portions, a turntable having an annular surface portion, a horizontally disposed idler wheel, a spring for maintaining the said idler wheel in engagement with the conical portion of said shaft and said annular turntable surface, a mount carrying said wheel, a manually operable shift lever comprising a handle adjustably moveable between extreme adjustment positions and a cam, said mount carrying a cam follower responsive to movement of said shift lever to cammingly adjustably move said cam follower so as to cause it to successively move said wheel from engagement with a pre-engaged portion of the conical portion of different diameter of said shaft, switch on and off means, means carried by said shift lever whereupon by movement of said shift lever said switch is moved into operative or non-operative position.

4. A drive mechanism for phonographs comprising a motor shaft, said shaft being provided with upper conical driving portions, a turntable having an annular surface portion, a horizontally disposed idler wheel, a spring for maintaining the said idler wheel in engagement with the conical portion of said shaft and said annular turntable surface, a mount carrying said wheel, a manually operable shift lever comprising a handle adjustably moveable between extreme adjustment positions and a cam, said mount carrying a cam follower responsive to movement of said shift lever to cammingly adjustably move said cam follower so as to cause it to successively move said wheel from engagement with a pre-engaged portion of the conical portion of different diameter of said shaft, switch on and off means, means carried by said shift lever whereupon by movement of said shift lever said switch is moved into operative or non-operative position, shift release means adapted to contact means carried by said mount to free said wheel of engagement with said annular portion of the turntable and said shaft when said switch means is moved to its "off" position.

5. A drive mechanism for phonographs comprising a motor shaft, said shaft being provided with upper conical driving portions, a turntable having an annular surface portion, a horizontally disposed idler wheel, a spring for maintaining the said idler wheel in engagement with the conical portion of said shaft and said annular turntable surface, a mount carrying said wheel, a manually operable shift lever comprising a handle adjustably moveable between extreme adjustment positions and a cam, said mount carrying a cam follower responsive to movement of said shift lever to cammingly adjustably move said cam follower so as to cause it to successively move said wheel from engagement with a pre-engaged portion of the conical surface and to shift it into engagement with a conical portion of different diameter of said shaft, said mount carrying downwardly extending means, shift release means disposed beneath said shift lever, said downwardly extending means adapted to be contacted by said shift release means to move said idler wheel inwardly of said annular portion of the turntable and laterally a spaced distance from the driving shaft, switch on and off means, means carried by said shift lever whereupon by movement of said shift lever said switch is moved into operative or non-operative position.

6. A drive mechanism for phonographs comprising a motor shaft, said shaft being provided with upper conical driving portions, a turntable having an annular surface portion, a horizontally disposed idler wheel, a spring for maintaining the said idler wheel in engagement with the conical portion of said shaft and said annular turntable surface, a mount carrying said wheel, a manually operable shift lever comprising a handle adjustably moveable between extreme adjustment positions and a cam, said mount carrying a cam follower responsive to movement of said shift lever to cammingly adjustably move said cam follower so as to cause it to successively move said wheel from engagement with a pre-engaged portion of the conical surface and to shift it into engagement with a conical portion of different diameter of said shaft, said mount carrying downwardly extending means, shift release means disposed beneath said shift lever, said downwardly extending means adapted to be contacted by said shift release means to move said idler wheel inwardly of said annular portion of the turntable and laterally a spaced distance from the driving shaft, switch on and off means, means carried by said shift lever whereupon by movement of said shift lever said switch is moved into operative or non-operative position, a spring for assisting the release of said shift release means when said shift release means is moved out of engagement with said downwardly extending means carried by the idler wheel mount.

7. In a drive mechanism for a phonograph, a phonograph motor, a support for said motor, said support having a turntable post associated therewith adapted to carry a turntable, a motor shaft having a conical upper surface, the turntable having a pendant flange, an idler wheel adapted to be interposed between said shaft and said turntable flange, a mount for said idler wheel secured to said support, said idler wheel adapted to be reciprocally and longitudinally moved with respect to said mount, said support having a pair of arcuate slots therein, a shift lever telescoped over said shaft, and having a manually operated handle portion, a relatively wide shift portion having an arcuate slot therein, means secured to said support projecting through said arcuate slot in the shift lever adapted to limit the range of movement of said shift lever, shift release means hingedly secured to said support on the undersurface thereof, said idler wheel having means associated therewith adapted upon movement of said shift lever into engagement with said shift release lever to optionally move said idler wheel into engagement and out of engagement with respect to said shaft and turntable flange.

8. In a driving mechanism for a phonograph, a phonograph motor, a support for said motor, switch on and off means carried by said support, a relatively large arcuate slot disposed in said support, said support having a turntable post associated therewith adapted to carry a phonograph turntable, the turntable having a pendant flange, an perture in said support, a motor shaft having a conical upper surface, an idler wheel adapted to be disposed above said support and positioned between said shaft and said turntable flange, a mount for said idler wheel secured to said support, said idler wheel adapted to be reciprocally and longitudinally moved with respect to said mount, a shift lever having a manually operable handle portion and a relatively wide shift portion, said shift lever having an aperture therein, said conical upper surface of said shaft being projected through said apertures in said support and shift lever, a vertically disposed camming flange adjacent the relatively wider edge of the shift lever, a downwardly disposed lug carried by said shift lever adjacent the said camming flange thereof, said downwardly extending lug adapted to be disposed through said relatively larger arcuate slot in the support, said on and off switch means located adjacent an end of said larger arcuate slot and projecting within said slot, said switch means adapted to be contacted by said lug upon movement of said manually operable handle portion to operate said switch, said mount carrying cam follower means responsive to movement of said shift lever to cause the same to successively move said idler wheel from engagement with a pre-engaged portion to a next-engaged portion of the conical surface of said motor shaft.

9. In a driving mechanism for a phonograph, a phonograph motor, a support for said motor, switch on and off means carried by said support, a relatively large arcuate slot disposed in said suport, said support having a turntable post associated therewith adapted to carry a phonograph turntable, the turntable having a pendant flange, an aperture in said support, a motor shaft having a conical upper surface, an idler wheel adapted to be disposed above said support and positioned between said shaft and said turntable flange, a mount for said idler wheel secured to said support, said idler wheel adapted to be reciprocally and longitudinally moved with respect to said mount, a shift lever having a manually operable handle portion and a relatively wide shift portion, said shift lever having an aperture therein, said conical upper surface of said shaft being projected through said apertures in said support and shift lever, a vertically disposed camming flange adjacent the relatively wider edge of the shift lever, a downwardly disposed lug carried by said shift lever adjacent the said camming flange thereof, said downwardly extending lug adapted to be disposed through said relatively larger arcuate slot in the support, said on and off switch means located adjacent an end of said larger arcuate slot and projecting within said slot, said switch means adapted to be contacted by said lug upon movement of said manually operable handle portion to operate said switch, said mount carrying cam follower means responsive to movement of said shift lever to cause the same to successively move said idler wheel from engagement with a pre-engaged portion to a next-engaged portion of the conical surface of said motor shaft, shift release means secured to said support adapted to move said idler wheel a spaced distance inwardly of said flange of the turntable and out of engagement with said conical upper surface of said motor shaft when said shift lever contacts said "on" and "off" switch means to move the same to its motor "off" or "on" position.

10. In a driving mechanism for a phonograph, a phonograph motor, a support for said motor, switch on and off means carried by said support, a relatively large arcuate slot disposed in said support, said support having a turntable post associated therewith adapted to carry a phonograph turntable, the turntable having a pendant flange, an aperture in said support, a motor shaft having a conical upper surface, an idler wheel adapted to be disposed above said support and positioned between said shaft and said turntable flange, a mount for said idler wheel secured to said support, said idler wheel adapted to be reciprocally and longitudinally moved with respect to said mount, a shift lever having a manually operable handle portion and a relatively wide shift portion, said shift lever having an aperture therein, said conical upper surface of said shaft being projected through said apertures in said support and shift lever, said relatively wide shift portion having an arcuate slot therein of lesser extent but of substantially the same curvature as the larger spaced arcuate slot disposed in said support, a vertically disposed camming flange adjacent the relatively wider edge of the shift lever, a downwardly disposed lug carried by said shift lever adjacent the said camming flange thereof, said downwardly extending lug adapted to be disposed through said relatively larger arcuate slot in the support, said on and off switch means located adjacent an end of said larger arcuate slot and projecting within said slot, said switch means adapted to be contacted by said lug upon movement of said manually operable handle portion to operate said switch, said mount carrying cam follower means responsive to movement of said shift lever to cause the same to successively move said idler wheel from engagement with a pre-engaged portion to a next-engaged portion of the conical surface of said motor shaft, shift release means secured to said support adapted to move said idler wheel a spaced distance inwardly of said flange of the turntable and out of engagement with said conical upper surface of said motor shaft when said shift lever contacts said "on" and "off" switch means to move the same to its motor "off" and "on" position.

11. In a driving mechanism for a phonograph, a phonograph motor, a support for said motor, switch on and off means carried by said support, a pair of different size arcuate slots disposed in separate relationship in said support, said support having a turntable post associated therewith adapted to carry a phonograph turntable, the turntable having a pendant flange, an aperture in said support, a motor shaft having a conical upper surface, an idler wheel adapted to be disposed above said support and positioned between said shaft and said turntable flange, a mount for said idler wheel secured to said support, said idler wheel adapted to be reciprocally and longitudinally moved with respect to said mount, a shift lever having a manually operable handle portion and a relatively wide shift portion, said shift lever having an aperture therein, said conical upper surface of said shaft being projected through said apertures in said support and shift lever, a vertically disposed camming flange adjacent the relatively wider edge of the shift lever, a downwardly disposed lug carried by said shift lever adjacent the said camming flange thereof, said downwardly extending lug adapted to be disposed through the relatively larger arcuate slot in the support, said "on" and "off" switch means located adjacent an end of said larger arcuate slot and projecting within said slot, said switch means adapted to be contacted by said lug upon movement of said manually operable handle portion to operate said switch, said mount carrying cam follower means responsive to movement of said shift lever to cause the same to successively move said idler wheel from engagement with a pre-engaged portion to a next-engaged portion of the conical surface of said motor shaft, shift release means secured to said support adjacent the relatively smaller arcuate slot in said support and beneath said support, said shift lever carrying downwardly extending means adapted to be projected through said relatively smaller arcuate slot, said shift release means adapted to move said idler wheel a spaced distance inwardly of said flange of the turntable and out of engagement with said conical upper surface of said motor shaft when said downwardly extending means carried by said shift lever contacts said "on" and "off" switch means to move the same to its motor "off" and "on" position.

12. In a driving mechanism for a phonograph, a phonograph motor, a support for said motor, switch on and off means carried by said support, a relatively large arcuate slot disposed in said support, said support having a turntable post associated therewith adapted to carry a phonograph turntable, the turntable having a pendant flange, an aperture in said support, a motor shaft having a conical upper surface, an idler wheel adapted to be disposed above said support and positioned between said shaft and said turntable flange, a mount for said idler wheel secured to said support, said idler wheel adapted to be reciprocally and longitudinally moved with respect to said mount, a shift lever having a manually operable handle portion and a relatively wide shift portion, said relatively wide shift portion having an arcuate slot disposed therein disposed inwardly of said relatively arcuate slot disposed in said support, means secured to said support adapted to be projected through said arcuate slot in the said shift lever to limit the range of longitudinal movement of said shift lever, said shift lever having an aperture therein, said conical upper surface of said shaft being projected through said apertures in said support and shift lever, a vertically disposed camming flange adjacent the relatively wider edge of the shift lever, a downwardly disposed lug carried by said shift lever adjacent the said camming flange thereof, said downwardly extending lug adapted to be disposed through said relatively larger arcuate slot in the support, said on and off switch means located adjacent an end of said larger arcuate slot and projecting within said slot, said switch means adapted to be contacted by said lug upon movement of said manually operable handle portion to operate said switch, said mount carrying cam follower means responsive to movement of said shift lever to cause the same to successively move said idler wheel from engagement with a pre-engaged portion to a next-engaged portion of the conical surface of said motor shaft.

13. In a drive mechanism for a phonograph, a phonograph motor, a support for said motor, said support having a turntable post associated therewith adapted to carry a turntable, a motor shaft having upper portions of different diameters, the turntable having a pendant flange, an idler wheel adapted to be interposed between said shaft and said turntable flange, a mount for said idler wheel secured to said support, said idler wheel adapted to be reciprocally and longitudinally moved with respect to said mount, a shift lever telescoped over said shaft and having a manually operated handle portion, a relatively wide shift portion having an arcuate slot therein, means secured to said support projecting through said arcuate slot in the shift lever adapted to limit the range of movement of said shift lever, shift release means hingedly secured to said support on the undersurface thereof, said idler wheel having means associated therewith adapted to be moved upon movement of said shift lever into engagement with said shift release lever to optionally move said idler wheel into engagement and out of engagement with respect to said shaft and turntable flange.

14. In a drive mechanism for a phonograph, a phonograph motor, a support for said motor, said support having a turntable post associated therewith adapted to carry a turntable, a motor shaft having upper portions of relatively different diameter, the turntable having a pendant flange, an idler wheel adapted to be interposed between said shaft and said turntable flange, a mount for said idler wheel secured to said support, said idler wheel adapted to be reciprocally and longitudinally moved with respect to said mount, said support having a pair of arcuate slots therein, a shift lever mounted upon said support, said shift lever having an arcuate slot therein, means adapted to be associated with said shift lever adapted to limit the range of movement of said shift lever, shift release means secured to said support on the undersurface thereof, said idler wheel having means associated therewith adapted to be moved upon movement of said shift lever into engagement with said shift release lever to optionally move said idler wheel into engagement with respect to said shaft and turntable flange.

15. A drive mechanism for phonographs comprising a motor shaft, said shaft being provided with upper portions of relatively different diameter, a turntable having an annular surface portion, a horizontally disposed idler wheel, a spring for maintaining the said idler wheel in selective engagement with said upper relatively different diameter portions of said shaft and said annular turntable surface, a mount carrying said wheel, a manually operable shift lever comprising a handle adjustably movable between extreme adjustment positions and a cam, said mount carrying a cam follower responsive to movement of said shift lever to cammingly adjustably move said cam follower so as to cause it to successively move said wheel from engagement with a pre-engaged portion of said shaft to a portion of different diameter on said shaft, switch on and off means, means carried by said shift lever whereupon by movement of said shift lever said switch is moved into operative or nonoperative position.

References Cited in the file of this patent

UNITED STATES PATENTS

| 2,529,376 | Dale | Nov. 7, 1950 |
| 2,584,580 | Hardy | Feb. 5, 1952 |
| 2,588,807 | Da Costa | Mar. 11, 1952 |

FOREIGN PATENTS

| 714,813 | Great Britain | Sept. 1, 1954 |